(12) United States Patent
Takeda

(10) Patent No.: US 8,232,900 B2
(45) Date of Patent: Jul. 31, 2012

(54) NAVIGATION SYSTEM AND ROUTE GUIDANCE METHOD

(75) Inventor: Atsushi Takeda, Iwaki (JP)

(73) Assignee: Alpine Electronics, Inc., Iwaki Fukushima (JP)

(*) Notice: Subject to any disclaimer, the term of this patent is extended or adjusted under 35 U.S.C. 154(b) by 343 days.

(21) Appl. No.: 12/241,520

(22) Filed: Sep. 30, 2008

(65) Prior Publication Data
US 2009/0119003 A1   May 7, 2009

(30) Foreign Application Priority Data
Nov. 2, 2007 (JP) ................. 2007-285776

(51) Int. Cl.
G08G 1/123 (2006.01)
G01C 22/00 (2006.01)
(52) U.S. Cl. ...................... 340/995.2; 701/25
(58) Field of Classification Search .......... 701/200–226, 701/41, 45, 65, 70, 96, 110, 408, 411, 301, 701/302; 340/988–996
See application file for complete search history.

(56) References Cited

U.S. PATENT DOCUMENTS

| | | | |
|---|---|---|---|
| 5,291,412 A | 3/1994 | Tamai et al. | |
| 5,893,045 A | 4/1999 | Kusama et al. | |
| 6,388,582 B2 | 5/2002 | Yamashita et al. | |
| 2006/0178810 A1* | 8/2006 | Hashima et al. | 701/200 |
| 2006/0217882 A1* | 9/2006 | Takashima et al. | 701/208 |
| 2008/0021643 A1* | 1/2008 | Nishiyama | 701/210 |

FOREIGN PATENT DOCUMENTS

| | | |
|---|---|---|
| JP | 08-201095 | 8/1996 |
| JP | 9-304105 | 11/1997 |
| JP | 10-227649 | 8/1998 |
| JP | 11-108679 | 4/1999 |
| JP | 2001-227970 | 8/2001 |

OTHER PUBLICATIONS

Office Action dated Apr. 11, 2012 issued in corresponding Japanese Patent Application No. 2007-285776 with translation.

* cited by examiner

*Primary Examiner* — James P Trammell
*Assistant Examiner* — Muhammad Shafi
(74) *Attorney, Agent, or Firm* — Brinks Hofer Gilson & Lione

(57) ABSTRACT

A navigation system provides guidance for performing a U-turn. The navigation system includes a processing unit, which acquires guidance route information and road information to determine whether the guidance route requires a turning around in a divided two-lane road. If a turning around is required, the processing unit specifies an extension distance of a connection road of the divided two-lane road. U-turn guidance is provided if the extension distance is at or below a predetermined length, or otherwise, to guidance is provided to prompt a double turn.

10 Claims, 9 Drawing Sheets

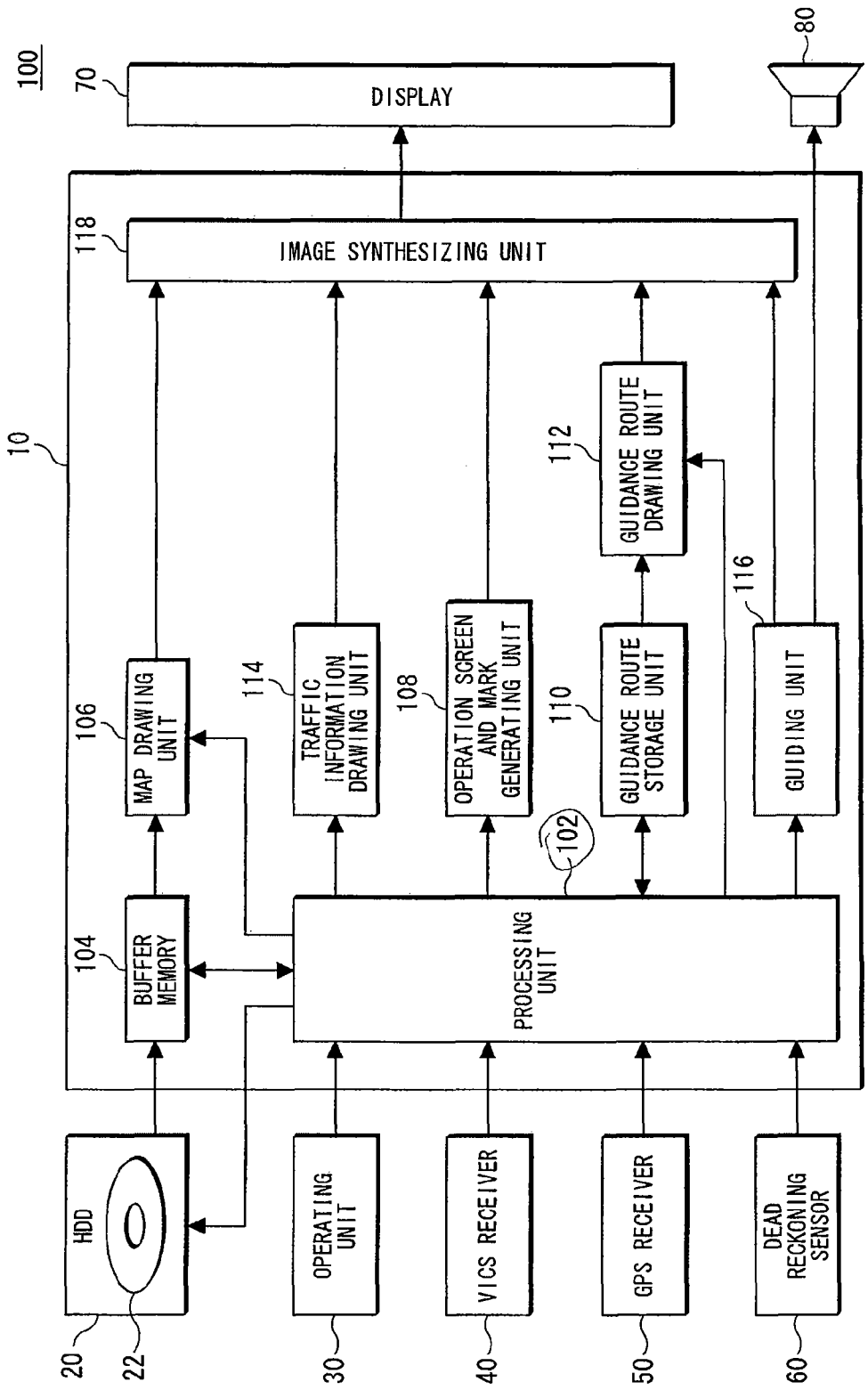

FIG.2(a)

NODE RECORD

| NODE NUMBER |
|---|
| NODE COORDINATE |
| CONNECTION LINK NUMBER |
| CONNECTION LINK NUMBER |
| ⋮ |

FIG.2(b)

LINK RECORD

| LINK NUMBER |
|---|
| LINK ATTRIBUTE |
| START-POINT NODE NUMBER |
| END-POINT NODE NUMBER |
| ⋮ |

FIG. 5

GUIDANCE ROUTE INFORMATION

| NODE#1 | NODE COORDINATE OF NODE#1 |
|---|---|
| NODE#5 | NODE COORDINATE OF NODE#5 |
| NODE#3 | NODE COORDINATE OF NODE#3 |
| NODE#8 | NODE COORDINATE OF NODE#8 |
| NODE#7 | NODE COORDINATE OF NODE#7 |

NAVIGATION SYSTEM AND ROUTE GUIDANCE METHOD

PRIORITY CLAIM

This application claims the benefit of Japanese Patent Application No. 2007-285776, filed on Nov. 2, 2007, and which is incorporated by reference herein in its entirety.

FIELD OF THE INVENTION

The present invention relates to a navigation system mounted on a vehicle, which displays map images, and a route guidance method of the same.

BACKGROUND OF THE INVENTION

For performing a U-turn guidance, as shown in FIG. 9, a conventional navigation system contains information on a U-turn guidance (U-turn guidance information) in both of the node record of a front node 311 of a link 301 corresponding to one lane of the road having a medial strip, and the node record of a front node 312 of a link 302 corresponding to the other lane. Accordingly, if at least one of the node records is not contained in the U-turn guidance information due to a data input error or the like, the conventional navigation system does not perform the U-turn guidance regardless of whether a U-turn is possible.

In another case where a wide medial strip exists, the driver may make a right turn or a left turn twice to turn around from a lane in one traveling direction on to a lane in the other traveling direction instead of making a U-turn. Even in this case, the conventional navigation system performs U-turn guidance in a manner confusing to the driver.

Some navigation systems prompt a driver to make a U-turn by showing a U-turn mark on the display in situations where the searched guidance route contains a road having a medial strip and where the driver must turn around from a lane in one direction to a lane in the other direction. (refer to Japanese Patent Application Publication No. 1998(H10)-227649, for example).

SUMMARY OF THE INVENTION

The present invention has been made in view of the above problems, and provides a navigation system capable of appropriately performing a U-turn guidance.

The navigation system detects a vehicle position and the vehicle's advancing direction by means of a Global Positioning System (GPS) or the like. The map data corresponding to the a vehicle position are read out from a map data recording medium, such as a hard disk, a CD-ROM, or a DVD-ROM, which stores a large amount of map data. Based on the map data, a map image around the vehicle position is displayed on a display unit, and a vehicle position mark is superposed on the image. The map image is scrolled on the display along with the movement of the vehicle. The navigation system thus facilitates a smooth perception of the vehicle position by a user.

Further, the navigation system is equipped with a route guidance function that permits the user to easily travel along a road to a destination. The map data is used to search a guidance route of the lowest link cost, which connects a starting place to a destination, and stores the searched route as a guidance route. During a travel of the vehicle, the guidance route is drawn on the map image with a thick line and is shown as a different color from the other roads. When the vehicle approaches within a predetermined distance to an intersection at which the vehicle has to change the course on the guidance route, an arrow indicating the course is displayed at the intersection on the map image. The vehicle is thus guided to the destination.

According to one aspect of the invention, the navigation system is mounted on a vehicle and searches a guidance route to a destination for guiding the vehicle. The system includes a guidance route information acquiring unit which acquires information on the guidance route. A road information acquiring unit acquires road information on roads contained in the guidance route and a guidance route determination unit determines when the guidance route is composed of a first lane and a second lane. The lanes have opposite traveling directions in a divided two-lane road, and a connection road connects the first lane and the second lane. The system determines whether the guidance route passes the first lane, the connection road, and the second lane (in that order), based on the guidance route information acquired by the guidance route information acquiring unit and based on the road information acquired by the road information acquiring unit. A condition determination unit determines whether the connection road satisfies a predetermined condition, if the guidance route determination unit determines that the guidance route passes the first lane, the connection road, and the second lane. A route guiding unit performs a route guidance to prompt a U-turn if the condition determination unit determines that the connection road satisfies the predetermined condition.

In this configuration, if the connection road connecting the first lane and the second lane satisfies a predetermined condition, the route guidance is performed to prompt a U-turn for turning around from the first lane into the second lane via the connection road so as to provide appropriate U-turn guidance.

The navigation system according to the invention may be configured such that the road information contains information on an extension distance of the connection road. The condition determination unit determines whether or not the extension distance of the connection road is at or below a predetermined length, and the route guiding unit performs the route guidance to prompt a U-turn if the condition determination unit determines that the extension distance of the connection road is at or below the predetermined length.

In this configuration, if the extension distance of the connection road is at or below the predetermined length, route guidance is performed to prompt a turning around from the first lane into the second lane by a U-turn.

Further, the navigation system according to the invention may be configured such that, if the condition determination unit determines that the extension distance of the connection road exceeds the predetermined length, the route guiding unit performs the route guidance to prompt a turn at a connecting point of the first lane and the connection road, and at a connecting point of the second lane and the connection road.

In this configuration, if the extension distance of the connection road exceeds the predetermined length, route guidance is performed to prompt a turning around from the first lane into the second lane via the connection road by making a double right turn or a double left turn, instead of making a U-turn.

According to the invention, if the connection road satisfies the predetermined condition, the route guidance is performed to prompt a U-turn for turning around from the first lane into the second lane via the connection road.

As described above, the navigation system of the invention is capable of appropriately performing a U-turn guidance.

BRIEF DESCRIPTION OF THE DRAWINGS

FIG. 1 illustrates the configuration of a navigation system;

FIGS. 2 (*a*) and (*b*) illustrate an example of the road information;

FIG. 5 illustrates an example of the guidance route information;

DETAILED DESCRIPTION OF THE INVENTION

Figure 3:
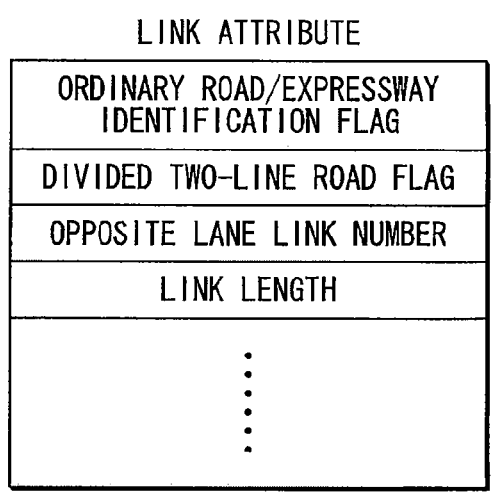
FIG. 3 illustrates an example of the link attribute.

The preferred embodiments of the invention are described in detail with reference to the appended drawings. FIG. 1 illustrates the configuration of a navigation system according to the invention. The navigation system 100 illustrated in FIG. 1 is mounted on a vehicle and includes a main body 10, a hard disk drive (HDD) 20, an operating unit 30, a VICS receiver 40, a GPS receiver 50, a dead reckoning sensor 60, a display 70, and a speaker 80.

The HDD 20 incorporates a hard disk 22, and reads out the map data recorded in the hard disk 22. The recording medium of the map data, which is not limited to the hard disk 22, may be a DVD, a CD-ROM, or the like. A corresponding drive to the recording medium is prepared. The entire map data is assigned to rectangular areas defined by the longitude and latitude of the four corners. The map data of each rectangular area includes an image data which corresponds to the rectangular area.

Further, the map data of each rectangular area includes information of a road in the rectangular area. FIGS. 2 (*a*) and (*b*) illustrate an example of the road information respectively. The road is expressed by a start-point, an end-point (nodes), and a straight line (road link) which connects these nodes. The road information is composed of a node record illustrated in FIG. 2(*a*) and the link record illustrated in FIG. 2(*b*). The node record illustrated in FIG. 2(*a*) is assigned to each node. The node record includes a node number which identifies the node, a coordinate (longitude and latitude) of the node, and a connection link number which identifies the link (connection link) having the node at its end. The link record illustrated in FIG. 2(*b*) is assigned to each road link. In this embodiment for a road which has lanes of opposite traveling directions, such as a divided two-lane road with a medial strip, the road link is assigned to both lanes of one traveling direction and the other traveling direction, and the link record is assigned to respective lanes of different traveling direction.

The link record includes a link number which identifies a corresponding road link, an attribute of the road link, a start-point node number, which identifies the node of a start-point of the road link, and an end-point node number, which identifies the node of an end-point of the road link. By using the node record and link record, a road area composed of the two nodes of a start-point and end-point and the link connecting these nodes can be specified.

FIG. 3 illustrates an example of the link attribute and shows an ordinary road/expressway identification flag, a divided two-lane road flag, an opposite lane link number, and a link length. The ordinary road/expressway identification flag indicates whether the road link is an ordinary road or an expressway. The divided two-lane road flag identifies whether the road link is a lane in one traveling direction in the divided two-lane road. The opposite lane link number is, when the road link indicates a lane in one traveling direction in the divided two-lane road, a link number of the road link corresponding to a lane in the traveling direction opposite to the lane. If the road link corresponds to a connection road, the link length information indicates an extension distance of the connection road concerned.

Referring to FIG. 1, the operating unit 30 has an operation button and joystick and the like (not illustrated). A user operates the unit for setting a destination of a guidance route. The VICS receiver 40 receives VICS information including traffic information, which is transmitted from a radio beacon or an optical beacon, or is transmitted to be multiplexed with an FM broadcasting signal. The VICS information is transmitted and updated by a predetermined cycle of a five-minute interval, for example.

The GPS receiver 50 receives a GPS signal from a GPS satellite necessary for detecting the vehicle position. The dead reckoning sensor 60 has an instrument, such as a gyroscopic sensor, for detecting the traveling direction of the vehicle, and a distance sensor, which generates pulses (speed pulse) at every constant travel distances.

The main body 10 has a processing unit 102, a buffer memory 104, a map drawing unit 106, an operation screen and mark generating unit 108, a guidance route storage unit 110, a guidance route drawing unit 112, a traffic information drawing unit 114, a guiding unit 116, and an image synthesizing unit 118. The main body 10 may also include a guidance route information acquiring unit 120 (FIG. 11), which may incorporate some of the components from the main body 10. In one embodiment, the guidance route information acquiring unit 120 may include the processing unit 102, the buffer memory 104, the map drawing unit 106, and the hard disk drive 20 shown in the main body 10.

Figure 11:
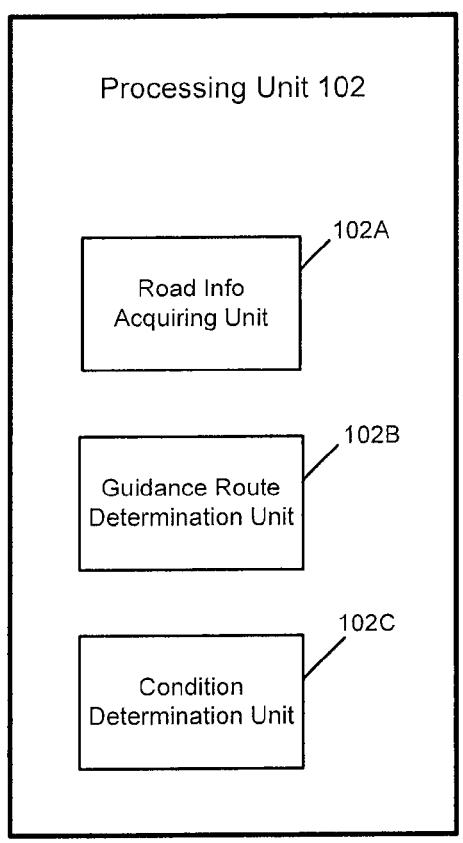
FIG. 11 depicts the processing unit having the road information acquiring unit, the guidance route determination unit, and the condition determination unit.

The processing unit 102 has a CPU and so forth, which controls the navigation system 100. Specifically, the processing unit 102 calculates the position and traveling speed of the vehicle based on the GPS signal received by the GPS receiver 50, the traveling direction of the vehicle, and the output interval of the speed pulses detected by the dead reckoning sensor 60. The processing unit 102 instructs the HDD 20 to read the map data recorded in the hard disk 22. The map data read out by HDD 20 is stored in the buffer memory 104. The map drawing unit 106 reads out the map data stored in the buffer memory 104, and draws a map image on the display 70. The processing unit 102 may also incorporate separate components, such as a road information acquiring unit 102A, a guidance route determination unit 102B, and a condition determination unit 102C, as shown in FIG. 11.

The processing unit 102 instructs the operation screen and mark generating unit 108 to draw an image in response to the user's operation to the operating unit 30 and the operational state of the navigation system 100. In response to this instruction, the operation screen and mark generating unit 108 draws various types of images, such as a menu screen, a vehicle position mark, and a cursor position mark.

The processing unit 102 reads out the map data stored in the buffer memory 104 in response to the user's operation to the operating unit 30 for searching a guidance route. From the map data, by using a simulation calculation based on a predetermined route search algorithm, such as the breadth-first search method or the Dijkstra's algorithm, the guidance route of the lowest link cost between the starting place and the destination is searched. The guidance route information is stored in the guidance route storage unit 110.

Figure 4:
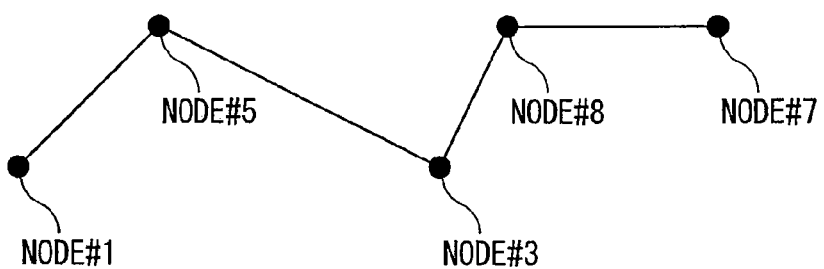
FIG. 4 illustrates an example of the guidance route.

FIG. 4 illustrates an example of the guidance route, and FIG. 5 illustrates an example of the guidance route information. When the guidance route passes the node numbers #1, #5, #3, #8, and #7 (in this order) from the starting place to the destination, as shown in FIG. 4, the node information on the guidance route in which these node numbers and the node coordinates are associated with each other and are listed in this order, as shown in FIG. 5 (hereafter, 'node information on the guidance route' is also referred to as 'guidance route node information').

Referring to FIG. 1, the guidance route drawing unit 112 generates a guidance route image based on the guidance route information stored in the guidance route storage unit 110.

The processing unit 102 instructs the traffic information drawing unit 114 to generate an image corresponding to the traffic information indicated by the VICS information received by the VICS receiver 40. The traffic information drawing unit 114 draws the image corresponding to the traffic information of this instructed mode.

The processing unit 102 calculates the vehicle position while guiding the route based on the guidance route information. Based on the vehicle position, the guidance route information, and the road information, the processing unit 102 determines whether the distance between the vehicle position and a turning point on the guidance route is within a predetermined range. If the distance between the vehicle position and the turning point is within the predetermined range, the processing unit 102 determines whether the guidance route requires that a U-turn be performed to cross the divided two-lane road at that turning point. If the guidance route requires a turning around, the processing unit 102 then determines whether or not the extension distance of the connection road is at or below a predetermined length, and whether the connection road is a U-turn road. If the extension distance of the connection road is at or below the predetermined length, the processing unit 102 instructs the guiding unit 116 to perform a U-turn guidance. On the other hand, if the extension distance of the connection road exceeds the predetermined length, the processing unit 102 instructs the guiding unit 116 to perform a double turn guidance. The guiding unit 116 draws an image corresponding to the U-turn guidance or the double turn guidance in response to the instruction by the processing unit 102. Further, the guiding unit 116 generates voice guidance for the U-turn or the double turn, and outputs the audio signal to the speaker 80.

The processing unit 102 instructs the image synthesizing unit 118 to synthesize an image according to the user's operation and the operational state of the navigation system 100. In response to this instruction, the image synthesizing unit 118 synthesizes various images drawn by the map drawing unit 106, the operation screen and mark generating unit 108, the guidance route drawing unit 112, the traffic information drawing unit 114, and the guiding unit 116. The display 70 displays the generated image.

The processing unit 102 generates audio signals according to the user's operation to the operating unit 30 and the operational state of the navigation system 100, and causes the speaker 80 to output the audio signal through the guiding unit 116.

In this embodiment, the processing unit 102 corresponds to the guidance route information acquiring unit, the road information acquiring unit, the guidance route determination unit, and the condition determination unit, while the guiding unit 116 corresponds to the route guidance unit.

Figure 6:
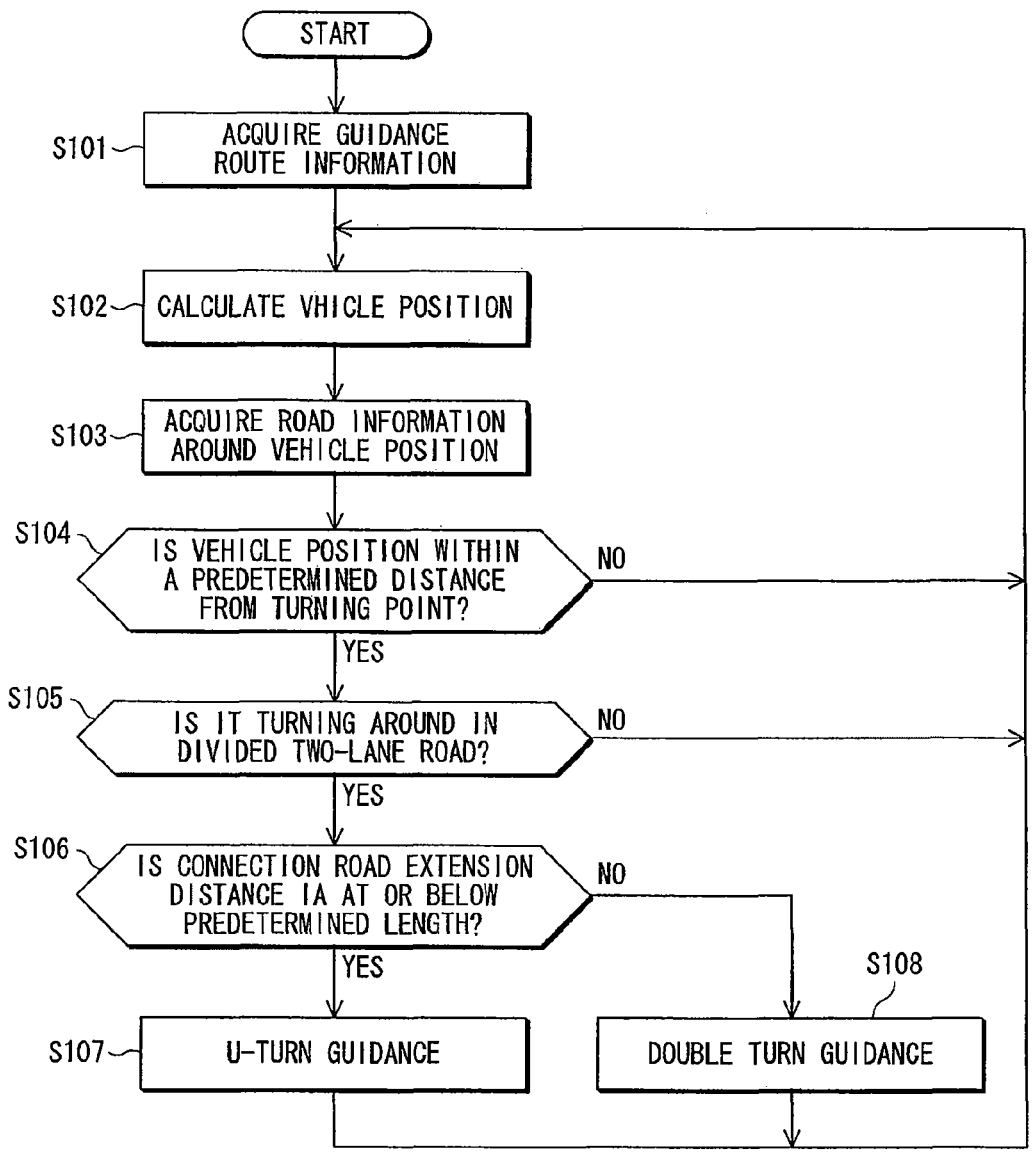
FIG. 6 illustrates the guidance operation for turning around in the divided two-lane road.

The navigation system 100 for providing guidance for turning around in a divided two-lane road is described. FIG. 6 is a flow chart illustrating the guidance operation for turning around in the divided two-lane road.

For starting route guidance, the processing unit 102 reads out the guidance route information stored in the guidance route storage unit 110 (S101). Further, the processing unit 102 acquires the GPS signal received by the GPS receiver 50, and the traveling direction of the vehicle and speed pulses detected by the dead reckoning sensor 60. The processing unit 102 then calculates a vehicle position based on this information (S102).

The processing unit 102 then specifies, to the HDD 20, a predetermined range of which center is the vehicle position calculated at S102 as a readout range for the map data. That is, the readout range is a circular area of which center is the vehicle position, and is uniquely specified by the longitude and latitude of the vehicle position and the radius. Further, the processing unit 102 notifies the HDD 20 of the longitude and latitude of the vehicle position and the radius which uniquely specifies the readout range, and instructs the HDD 20 to read out the map data contained in the readout range concerned. In response to this instruction, the HDD 20 compares the readout range to the longitude and latitude at the four corners of each rectangular area in the map data. Further, the HDD 20 specifies a rectangular area which is contained wholly or partly contained in the readout range, and reads out the map data corresponding to the rectangular area from the hard disk 22. The read out map data is stored in the buffer memory 104. The processing unit 102 reads out the road information contained in the map data stored in the buffer memory 104 (S103).

Next, the processing unit 102 determines whether the distance between the vehicle position and the turning point on the guidance route is within a predetermined range (within 700 meters, for example) (S104). Here, the processing unit 102 specifies a node which the vehicle has passed most recently (most-recently passed node) from among the nodes specified by the node numbers contained in the guidance route information, in other words, the nodes on the guidance route information. Specifically, the processing unit 102 continuously compares the vehicle position to the node coordinates inside the guidance route node information contained in the guidance route information. If the vehicle position coincides with any of the node coordinates, the processing unit 102 specifies the guidance route node information containing that particular node coordinate as the guidance route node information corresponding to the most-recently passed node.

Figure 7:
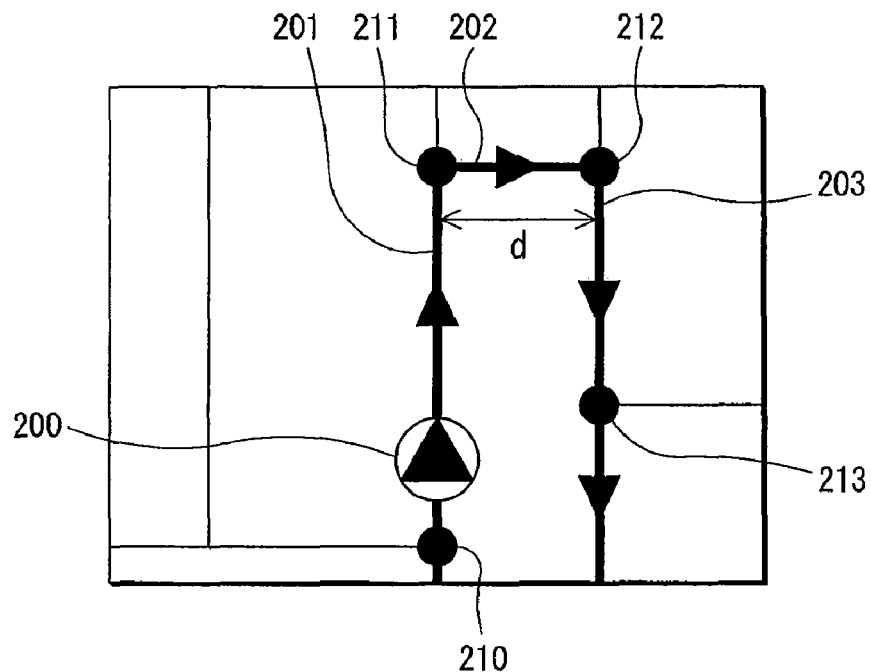
FIG. 7 illustrates the route guidance of an embodiment of this invention.

Further, the processing unit 102 specifies, in the guidance route information, the guidance route node information being located after the guidance route node information corresponding to the most-recently passed node, as the guidance route node information corresponding to the nodes to be passed (not-yet passed node). For example, assume that as shown in FIG. 7, a guidance route (thick line) is set with the road links 201, 202, and 203, which pass the nodes 210, 211, 212, and 213 in this order, and also assume that a vehicle position 200 on the road link 201 between the node 210 and the node 211. In this case, the most-recently passed node is node 210, and the not-yet passed nodes are nodes 211, 212, and 213.

Furthermore, the processing unit 102 specifies the locations of the most-recently passed node and the not-yet passed node on the basis of the node coordinates inside the guidance route node information corresponding to each of the most-recently passed node and the not-yet passed node, and based on the locations, determines whether there is a node corresponding to a turning point of the not-yet passed node. In FIG. 7, for example, the road link 201, which connects the node 210 being the most-recently passed node and the node 211 being the not-yet passed node, intersects with the road link 202, which connects the node 211 being the not-yet passed node and the node 212 being the not-yet passed node. In this case, the processing unit 102 determines that the node 211 as the turning point.

If there is a not-yet passed node being a turning point (turning point node), the processing unit 102 calculates the distance along the guidance route from the vehicle position to the turning point node. This distance is calculated on the basis of the vehicle position and the node coordinates inside the guidance route node information corresponding to the nodes from the vehicle position to the turning point node, which is contained in the guidance rote information. In FIG. 7, for example, the distance between the vehicle position 200 and the node 211 being the turning point node is calculated. Further, the processing unit 102 determines whether this calculated distance is within the predetermined range. If there are multiple turning point nodes, the processing unit 102 specifies the turning point node to be first passed among the multiple curving nodes. The processing unit 102 then calculates the distance along the guidance route between the vehicle position and the specified turning point node.

If the distance between the vehicle position and the turning point on the guidance route is not within the predetermined range, the operation after acquiring the vehicle position (S102) is repeated. On the other hand, if the distance between the vehicle position and the turning point on the guidance route is within the predetermined range, the processing unit 102 determines whether the turn at the turning point corresponds to a turning around in the divided two-lane road from a lane in one traveling direction to a lane in the other traveling direction (S105).

Specifically, the processing unit 102 specifies, in the guidance route information, the guidance route node information located one node behind, one node ahead, and two nodes ahead, the guidance route node information corresponding to the turning point node. The guidance route node information located one node behind from the guidance route node information corresponding to the turning point node is the guidance route node information of the node (the previous node) that is passed one node behind the turning point node in the guidance route. The guidance route node information located one node ahead of the guidance route node information corresponding to the turning point node is the guidance route node information of the node (the first latter node) which is passed one node ahead the turning point node in the guidance route. The guidance route node information located two nodes ahead of the guidance route node information corresponding to the turning point node is the guidance route node information of the node (the second latter node) which is passed two nodes ahead of the turning point node in the guidance route. In FIG. 7, for example, the node to be passed one node behind from the turning point 211 is the node 210, the node to be passed after one node is the node 212, and the node to be passed two nodes ahead is the node 213.

Next, the processing unit 102 extracts from among the link records inside the road information acquired at S103, a link record for which the start-point node number coincides with the node number inside the guidance route node information corresponding to the previous node, and for which the end-point node number coincides with the node number inside the guidance route node information corresponding to the turning point node. The extracted link record corresponds to the road link of which the previous node is the starting node and the turning point node is the end node in the guidance route. Further, the processing unit 102 determines whether the divided two-lane road flag contained in the link attribute inside the extracted link record indicates that the corresponding road link is a lane in one traveling direction in the divided two-lane road.

If the divided two-lane road flag does not indicate that the corresponding road link is a lane in one traveling direction in the divided two-lane road, the road link of which the previous node is the starting node, and the turning point node is the end node in the guidance route is not the lane in one traveling direction in the divided two-lane road. In this case, the negative judgment is made at S105.

On the other hand, if the divided two-lane road flag indicates that the corresponding road link is a lane in one traveling direction in the divided two-lane road, the road link of which the previous node is the starting node and the turning point node is the end node in the guidance route is the lane in one traveling direction in the divided two-lane road. In this case, the processing unit 102 extracts the opposite lane link number contained in the link attribute inside the extracted link record. Further, the processing unit 102 extracts a link record containing the extracted opposite lane link number from among the link records inside the road information acquired at S103.

The processing unit 102 then determines whether the start-point node number inside the extracted link record coincides with the node number inside the guidance route node information corresponding to the first latter node, and determines whether the end-point node number coincides with the node number inside the guidance route node information corresponding to the second latter node. If these do not coincide, the node corresponding to the start-point node number does not indicate a turning around in the divided two-lane road, and the negative judgment is made at S105.

On the other hand, if the start-point node number inside the extracted link record coincides with the node number inside the guidance route node information corresponding to the first latter node, and the end-point node number coincides with the node number inside the guidance route node information corresponding to the second latter node, the guidance route which passes the previous node, the turning point node, the first latter node, and the second latter node (in this order) means that the vehicle travels in a lane in one traveling direction in the divided two-lane road, and thereafter turns around and travels in the lane in the other traveling direction. In this case, the affirmative judgment is made at S105.

If the negative judgment is made at S105, the operation after acquiring the vehicle position (S102) is repeated. However, the processing unit 102 instructs the guiding unit 116 to perform the usual intersection guidance, which prompts the driver to make a right or left turn. The guiding unit 116 draws the image of the intersection guidance and generates the audio output. The image of the intersection guidance is appropriately synthesized with the other images by the image synthesizing unit 118, and is shown on the display 70. The intersection guidance audio signal is output from the speaker 80.

On the other hand, if the affirmative judgment is made at S105, the processing unit 102 determines whether the extension distance of the connection road is at or below a predetermined length (at or below 10 m, for example) (S106). Specifically, the processing unit 102 specifies the extension distance of the connection road by the link length contained in the link attribute inside the link record corresponding to the connection road extracted at S106, and determines whether the extension distance is at or below the predetermined length. In FIG. 7, the length "d" of the road link 202 corresponding to the connection road is the extension distance.

Figure 8:
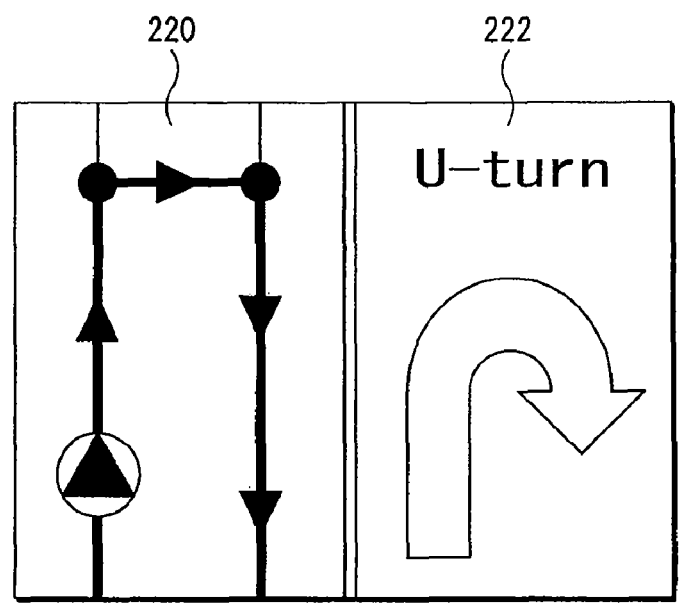
FIG. 8 illustrates an example of the guidance image.
Figure 9:
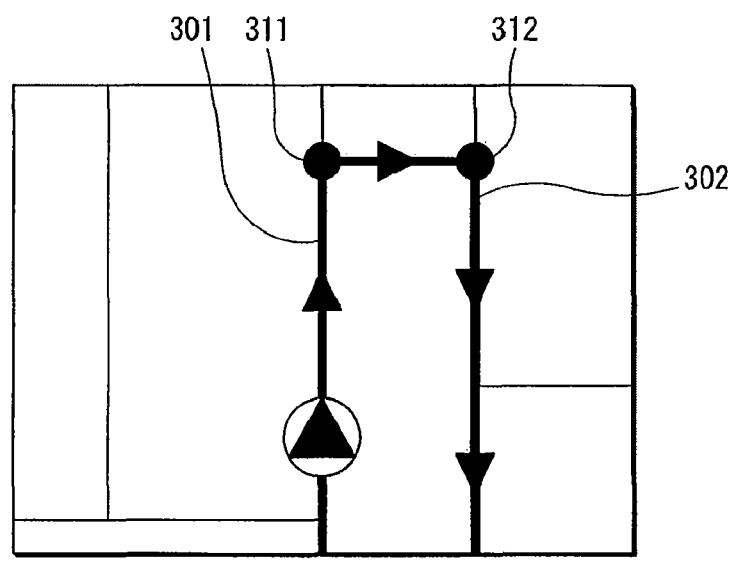
FIG. 9 illustrates conventional route guidance.
Figure 10:
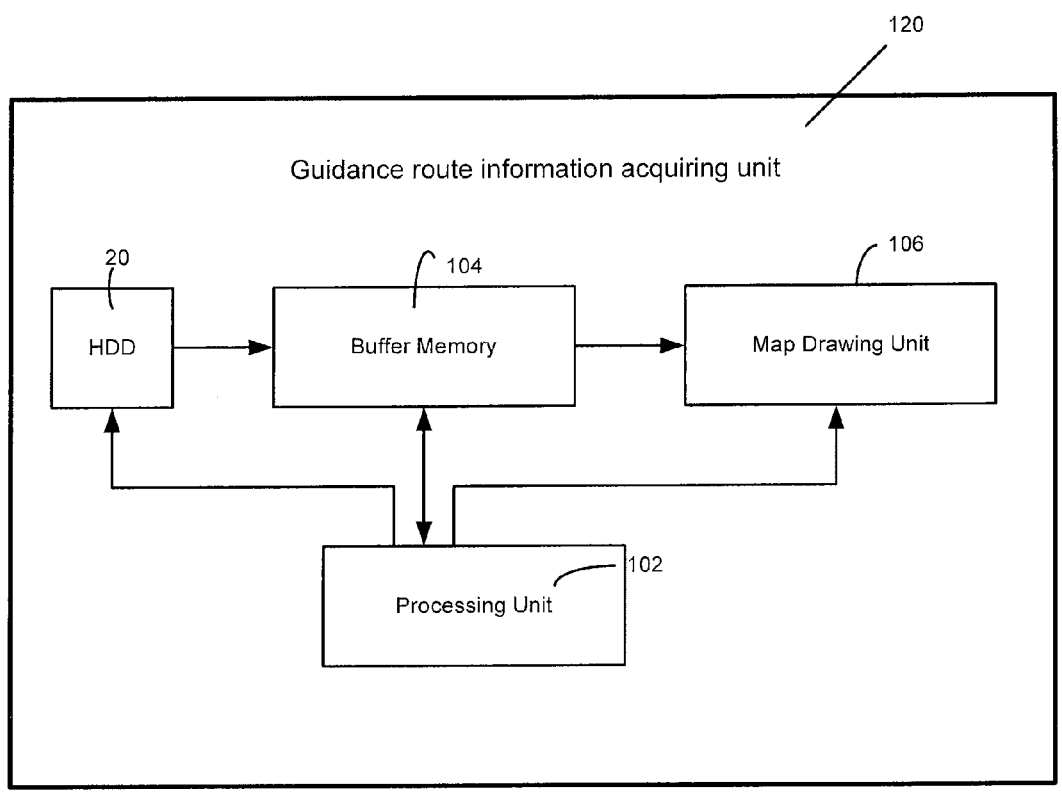
FIG. 10 illustrates a guidance route information acquiring unit.

If the extension distance of the connection road is at or below the predetermined length, the processing unit 102 instructs the guiding unit 116 to perform guidance to prompt a U-turn (U-turn guidance) passing the turning point node, the first latter node, and the second latter node (in this order). In response to this instruction, the guiding unit 116 draws the image of the U-turn guidance, and generates the audio output. The image of the U-turn guidance is appropriately synthesized with the other images by the image synthesizing unit 118, and is shown on the display 70. The U-turn guidance audio output is output from the speaker 80 (S107). As shown in FIG. 8, for example, the display 70 shows a map image 220 around the vehicle position and an image 222, which prompts the driver to make a U-turn. Thereafter, the operation after calculating the vehicle position (S102) is repeated.

On the other hand, if the extension distance of the connection road is determined to exceed the predetermined length at S107, the processing unit 102 instructs the guiding unit 116 to perform guidance to prompt a turn at each turning point node and the first latter node (double turn guidance). In response to this instruction, the guiding unit 116 draws the image of the double turn guidance, and generates the audio output. The double turn guidance image is appropriately synthesized with the other images by the image synthesizing unit 118, and is shown on the display 70. The double turn guidance audio output is output from the speaker 80 (S108). Thereafter, the operation after calculating the vehicle position (S102) is repeated.

Thus, in this embodiment, the navigation system acquires the guidance route information and the road information corresponding to the road around the vehicle position. Based on this information, the navigation system determines whether the guidance route requires a turning around to a lane of which the traveling direction is opposite, through the connection road in the divided two-lane road. If the guidance route requires a turning around and the extension distance of the connection road is at or below a predetermined length, the navigation system performs guidance to prompt a U-turn. Otherwise, the system performs guidance to prompt a double turn. Therefore, the system performs an appropriate U-turn guidance.

Although only a few exemplary embodiments have been described in detail above, those skilled in the art will readily appreciate that many modifications are possible in the exemplary embodiments without materially departing from the novel teachings and advantages of the invention. Accordingly, all such modifications are intended to be included within the scope of this invention as defined in the following claims.

The invention claimed is:

1. A navigation system mounted on a vehicle, which searches a guidance route to a destination for guiding the vehicle, comprising:
   a guidance route information acquiring unit configured to acquire information on the guidance route;
   a road information acquiring unit configured to acquire road information on roads contained in the guidance route;
   a guidance route determination unit configured to determine, when the guidance route is composed of a first lane and a second lane, the lanes having opposite traveling directions in a divided two-lane road and a connection road connecting the first lane and the second lane, whether the guidance route passes in the order of the first lane, the connection road, and the second lane, based on the guidance route information acquired by the guidance route information acquiring unit and the road information acquired by the road information acquiring unit;
   a condition determination unit configured to determine whether the connection road corresponds to an extension distance greater than a predetermined distance, if the guidance route determination unit determines which the guidance route passes in the order of the first lane, the connection road, and the second lane;
   a route guiding unit configured to perform and issue double-turn guidance to prompt a user to perform a double-turn, if the condition determination unit determines that the connection road corresponds to an extension distance greater than the predetermined distance; and
   the route guiding unit configured to perform and issue U-turn guidance to prompt a user to perform a U-turn, if the condition determination unit determines that the connection road corresponds to an extension distance less than or equal to the predetermined distance.

2. A navigation system according to claim 1, wherein
   the road information contains information on the extension distance of the connection road;
   the condition determination unit determines whether or not the extension distance of the connection road is at or below a predetermined length; and
   the route guiding unit performs the route guidance to prompt the U-turn, if the condition determination unit determines that the extension distance of the connection road is at or below the predetermined length.

3. A navigation system according to claim 2, wherein the route guidance to prompt a U-turn includes an image or an audio output.

4. A navigation system according to claim 2, wherein if the condition determination unit determines that the extension distance of the connection road exceeds the predetermined length, the route guiding unit performs a route guidance to prompt a first turn at a connecting point of the first lane and the connection road, and a second turn at a connecting point of the second lane and the connection road.

5. A navigation system according to claim 4, wherein the route guidance to prompt a turn includes an image or an audio output.

6. A route guidance method mounted on a vehicle configured to search a guidance route to a destination for guiding the vehicle, comprising the steps of:
   acquiring information on the guidance route using a guidance route information acquiring unit;
   acquiring road information on roads contained in the guidance route;
   determining, using a guidance route determination unit, when the guidance route is composed of a first lane and a second lane, the lanes having opposite traveling directions in a divided two-lane road, and a connection road connecting the first lane and the second lane, whether the guidance route passes in the order of the first lane, the connection road, and the second lane, based on the guidance route information and road information acquired;
   determining whether the connection road corresponds to an extension distance greater than a predetermined distance, if it is determined that the guidance route passes in the order of the first lane, the connection road, and the second lane; and
   performing and issuing double-turn route guidance to prompt a user to perform a double-turn, using the route guiding unit, if it is determined that the connection road corresponds to an extension distance greater than the predetermined distance;
   performing and issuing U-turn route guidance to prompt a user to perform a U-turn, using the route guiding unit, if it is determined that the connection road corresponds to an extension distance less than or equal to the predetermined distance.

7. A route guidance method according to claim 6, wherein:
the road information contains information on the extension distance of the connection road;
determining whether or not the extension distance of the connection road is at or below a predetermined length when determining whether the connection road satisfies the predetermined condition; and
the route guidance to prompt the U-turn is performed when performing the route guidance, if it is determined that the extension distance of the connection road is at or below the predetermined length.

8. A route guidance method according to claim 7, wherein the route guidance to prompt a U-turn includes an image or an audio output.

9. A route guidance method according to claim 7, wherein if it is determined that the extension distance of the connection road exceeds the predetermined length, a route guidance is performed to prompt a first turn at a connecting point of the first lane and the connection road, and prompt a second turn at a connecting point of the second lane and the connection road.

10. A route guidance method according to claim 9, wherein the route guidance to prompt a turn includes an image or an audio output.

\* \* \* \* \*